(12) United States Patent
Lolatchy

(10) Patent No.: US 11,905,022 B2
(45) Date of Patent: Feb. 20, 2024

(54) HELICOPTER FLIGHT SUPPORT

(71) Applicant: Schain Lolatchy, Rockville, MD (US)

(72) Inventor: Schain Lolatchy, Rockville, MD (US)

( * ) Notice: Subject to any disclaimer, the term of this patent is extended or adjusted under 35 U.S.C. 154(b) by 129 days.

(21) Appl. No.: 17/683,877

(22) Filed: Mar. 1, 2022

(65) Prior Publication Data
US 2022/0306302 A1 Sep. 29, 2022

Related U.S. Application Data

(60) Provisional application No. 63/165,541, filed on Mar. 24, 2021.

(51) Int. Cl.
*B64D 25/00* (2006.01)
(52) U.S. Cl.
CPC ................ *B64D 25/00* (2013.01)
(58) Field of Classification Search
CPC .......... B64D 25/00; B64C 3/56; B64C 27/006
See application file for complete search history.

(56) References Cited

U.S. PATENT DOCUMENTS

| | | | |
|---|---|---|---|
| 2,743,072 A | 4/1956 | Emmi | |
| 3,599,904 A | 8/1971 | Condit et al. | |
| 3,826,448 A * | 7/1974 | Burk, Jr. ................ | B64C 5/12 |
| | | | 244/90 R |
| 5,474,257 A | 12/1995 | Fisher et al. | |
| 5,884,863 A | 3/1999 | Fisher et al. | |
| 8,066,229 B2 | 11/2011 | Hogan | |
| 10,293,928 B2 | 5/2019 | Vetter et al. | |
| 10,696,376 B2 | 6/2020 | Ji et al. | |
| 2010/0078526 A1 | 4/2010 | Mulero Valenzuela | |
| 2017/0283035 A1 | 10/2017 | Ji et al. | |

FOREIGN PATENT DOCUMENTS

| | | | | |
|---|---|---|---|---|
| CN | 108058812 A | | 5/2018 | |
| CN | 108128449 A | | 6/2018 | |
| CN | 109353496 A | * | 7/2018 | ............... B64C 3/56 |
| CN | 109552607 A | * | 4/2019 | |
| CN | 111792020 A | * | 10/2020 | ............. B64C 19/00 |

OTHER PUBLICATIONS

Machine translation of CN-109353496-A, Liao Y, Jul. 2018 (Year: 2018).*
Machine translation of CN-111792020-A, Li Z, Oct. 2020 (Year: 2020).*
Machine translation of CN-109552607-A, Zhang Y, Apr. 2019 (Year: 2019).*
International Search Report and Written Opinion dated Jun. 7, 2022, from PCT/US2022/020866, 12 sheets.

* cited by examiner

*Primary Examiner* — Tien Q Dinh
*Assistant Examiner* — Katherine June Bolek
(74) *Attorney, Agent, or Firm* — Katten Muchin Rosenman LLP

(57) ABSTRACT

Disclosed herein is a helicopter flight support for use in case of emergencies. The helicopter flight support comprises a motor which causes a threaded shaft to turn which is coupled to an underside of the helicopter. This causes outer supports and inner supports to be deployed until they reach a wing-like configuration. The interior of the wing comprises a plurality of support cables for tensioning the wing. The helicopter flight support further comprises upper and lower support cables mounted to the tips of the wing to provide horizontal stability.

22 Claims, 14 Drawing Sheets

HELICOPTER FLIGHT SUPPORT

CROSS-REFERENCE TO RELATED APPLICATIONS

This application claims priority to U.S. Provisional Application Ser. No. 63/165,541, filed Mar. 24, 2021, the entire contents of which are hereby incorporated by reference in their entirety.

FIELD OF THE INVENTION

The present invention discloses a helicopter flight support for allowing a helicopter to safely land in the event of rotor failure.

BACKGROUND

Helicopters typically fly at much lower altitudes than airplanes during routine use. As a result, any failure of the rotor can quickly land in a crash landing due to the reduced height. Most attempts at safety or escape systems have focused on deploying a parachute from the top of the helicopter or ejecting the pilot/passengers in a capsule or ejection seat. However, both of these escape systems do not provide any control over the descent and rely on parachutes to deploy which can require hundreds of feet to successfully deploy and slow objects as large as a helicopter. Therefore, a need exists for a helicopter flight support that can be safely deployed in the case of rotor failure that prolongs the descent, thus slowing the helicopter, while allowing some control over the descent.

SUMMARY

Disclosed herein is a helicopter flight support for use in case of emergencies. The helicopter flight support comprises a motor which causes a threaded shaft to turn which is coupled to an underside of the helicopter. This causes outer supports and inner supports to be deployed until they reach a wing-like configuration. The interior of the wing comprises a plurality of support cables for tensioning the wing. The helicopter flight support further comprises upper and lower support cables mounted to the tips of the wing to provide horizontal stability.

DETAILED DESCRIPTION

Figure 1:
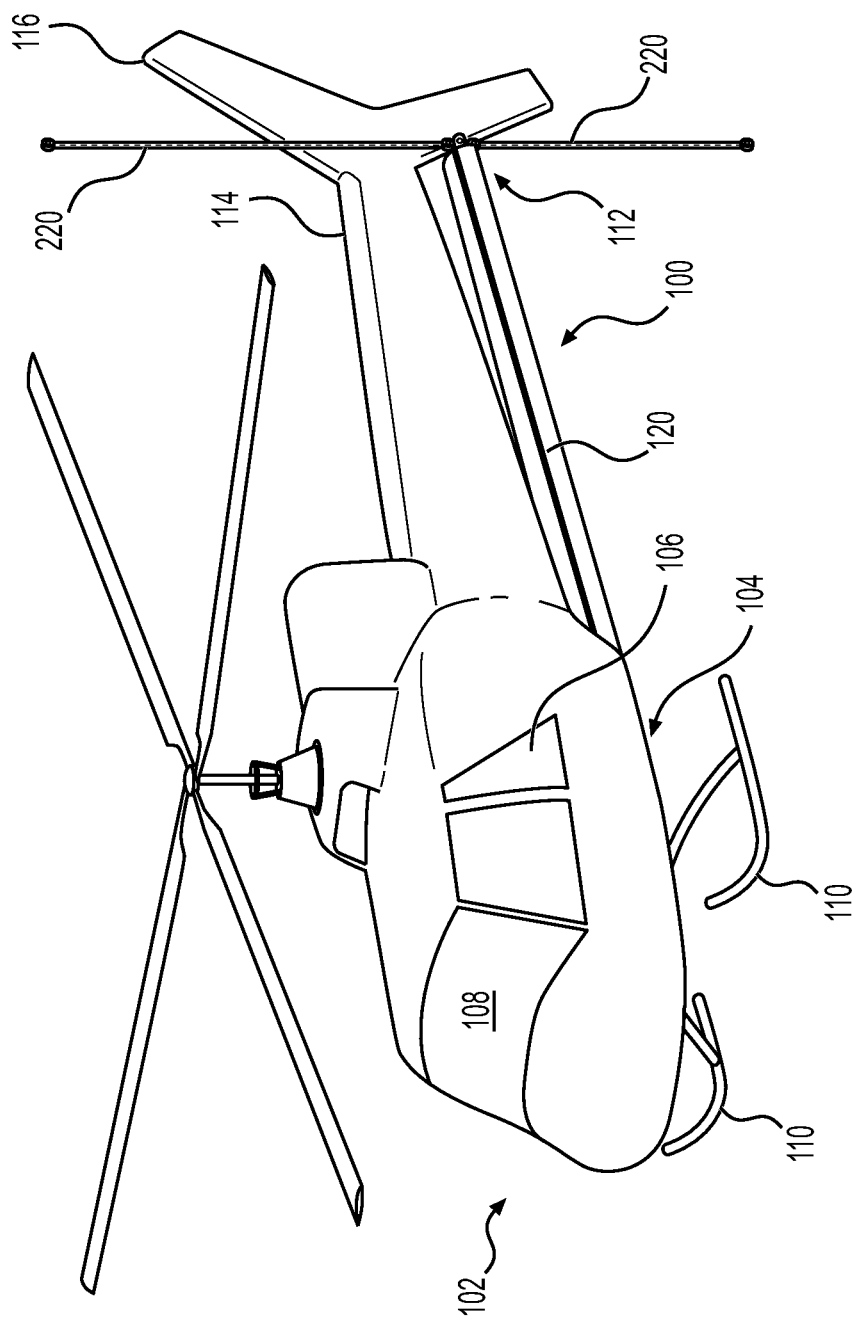
FIG. 1 depicts a perspective view of the helicopter flight support in accordance with an embodiment of the invention.

FIG. 1 depicts a perspective view of helicopter flight support 100 mounted to an underside of helicopter 102. A first end 104 of helicopter flight support 100 is coupled to the underside of the passenger compartment 106 or cockpit 108 between landing skids 110. The exact coupling position is determined by the requirements of the helicopter 102 (e.g., geometry, weight). A second end 112 of the helicopter flight support 100 is coupled to an underside of tail 114 or rudder 116. The exact coupling position of the second end 112 is also determined by the requirements of helicopter 102 or the shape/design.

The helicopter flight support 100 is shown in the stowed position in FIG. 1 and the majority of its components are shielded by cover 120 which forms a shell surrounding the majority of helicopter flight support 100 in the closed position. As will be described later, cover 120 is preferably formed from two C-shaped cross-sectional pieces that mate to form a cylinder or elliptic cylinder surrounding helicopter flight support 100. A first half of cover 120 preferably mates with the second half of cover 120 via a lip, such that the two halves overlap along their length when closed. Cover 120 protects many mechanical parts of helicopter flight support 100 from inclement weather and helps to hold helicopter flight support 100 in the stowed state. Cover 120 also provides lift as in an airplane. The cross-section of cover 120 decreases from the front of helicopter flight support 100 to the rear of helicopter flight support 100.

Figure 2:
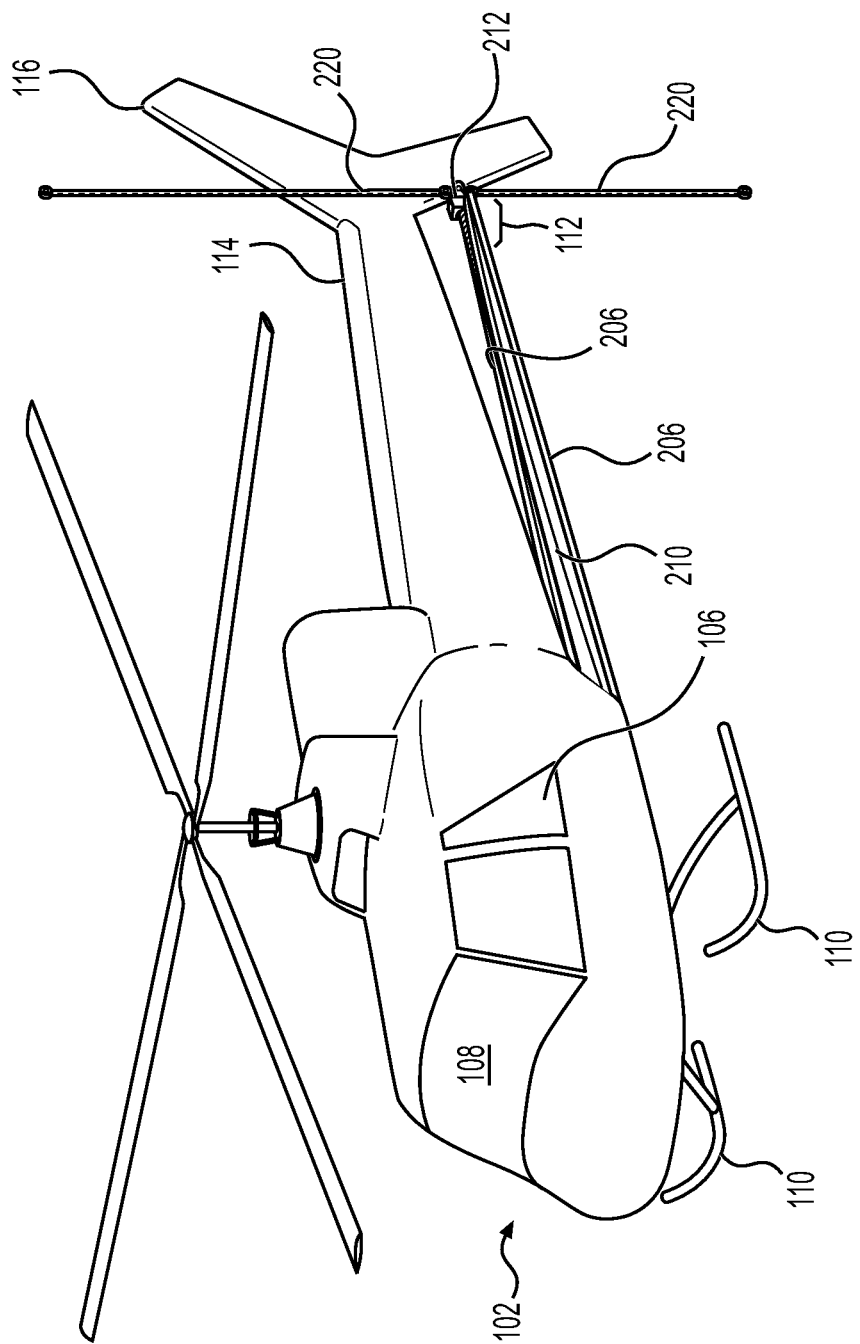
FIG. 2 depicts a perspective view of the helicopter flight support with the cover removed.
Figure 3:
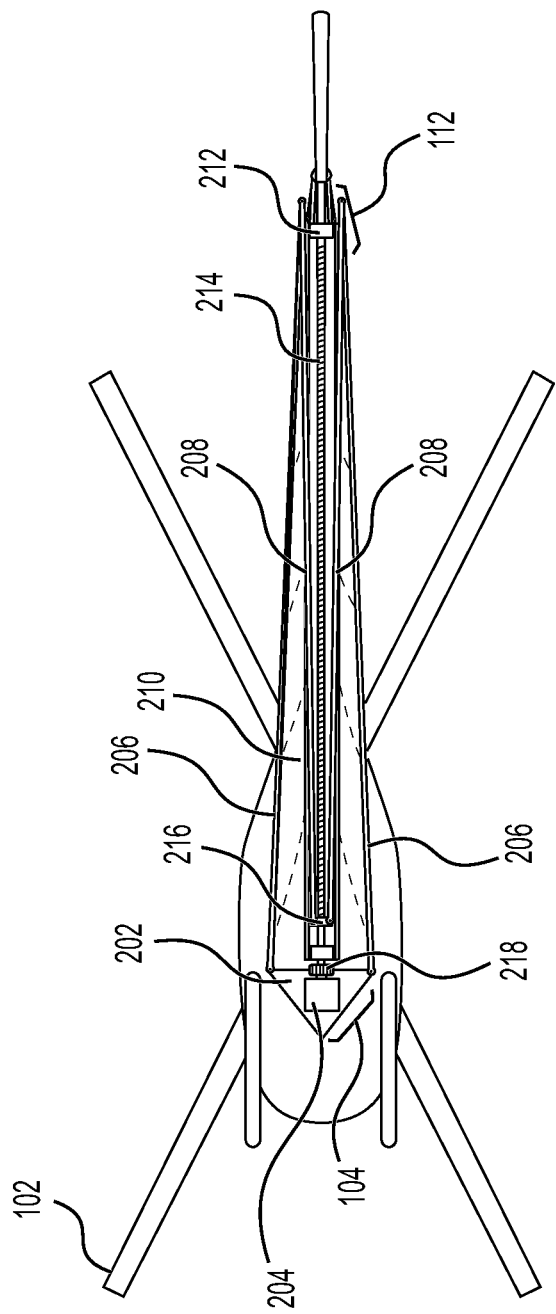
FIG. 3 depicts a bottom view of the helicopter flight support in the undeployed configuration.

FIG. 2 depicts a perspective view of helicopter flight support 100 with the cover 120 removed and FIG. 3 depicts a bottom view of helicopter flight support 100. Helicopter flight support 100 generally comprises front mounting bracket 202, motor 204, outer supports 206, inner supports 208, fabric 210, rear mounting bracket 212, threaded shaft 214, deployment support 216, coupling gears 218, and stability supports 220. Other features of helicopter flight support 100 not visible in FIGS. 1-3 will be described in the subsequent drawings.

Figure 11:
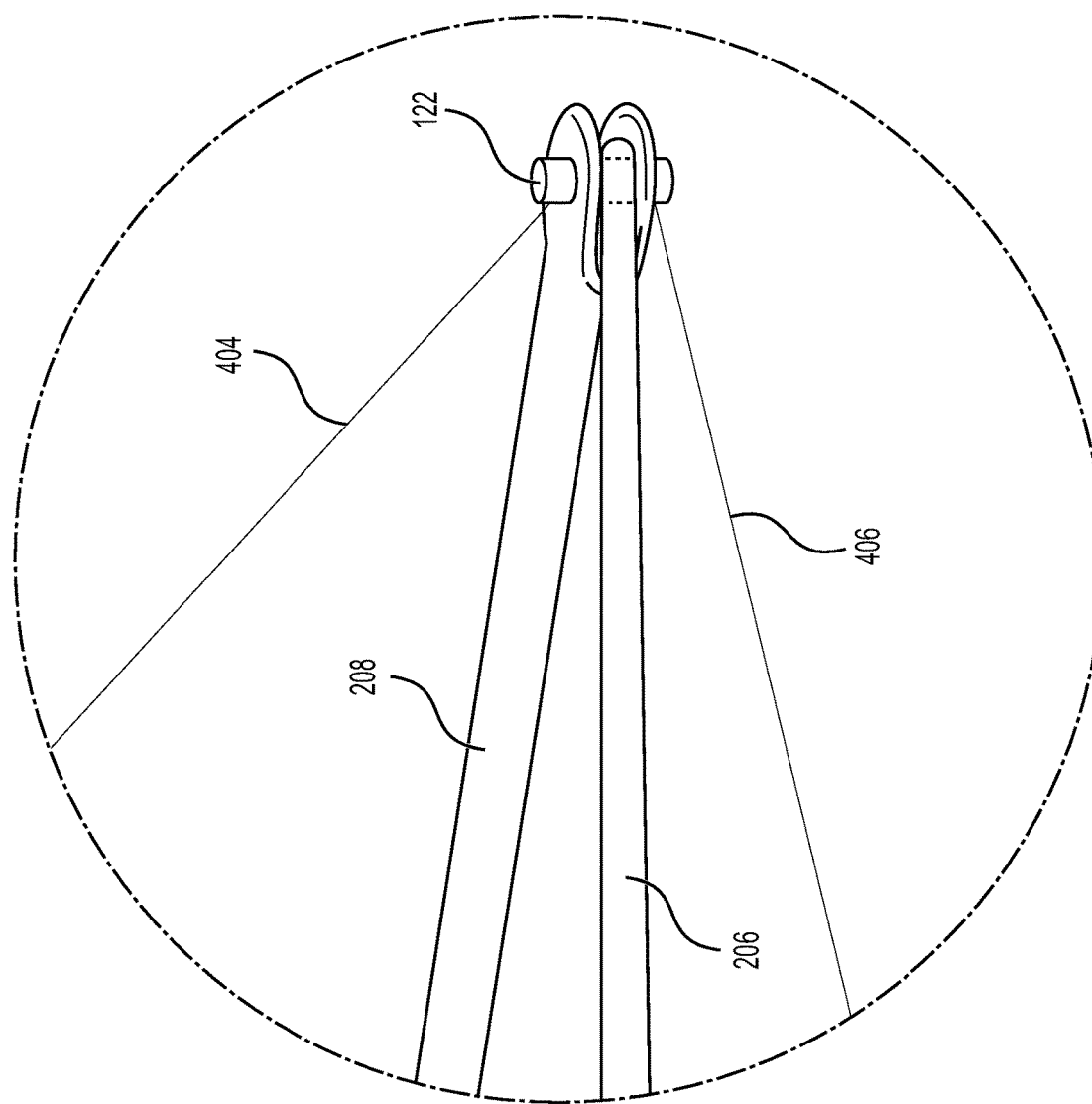
FIG. 11 depicts an enhanced view of a pivot joint showing the coupling between an outer support and an inner support.
Figure 12:
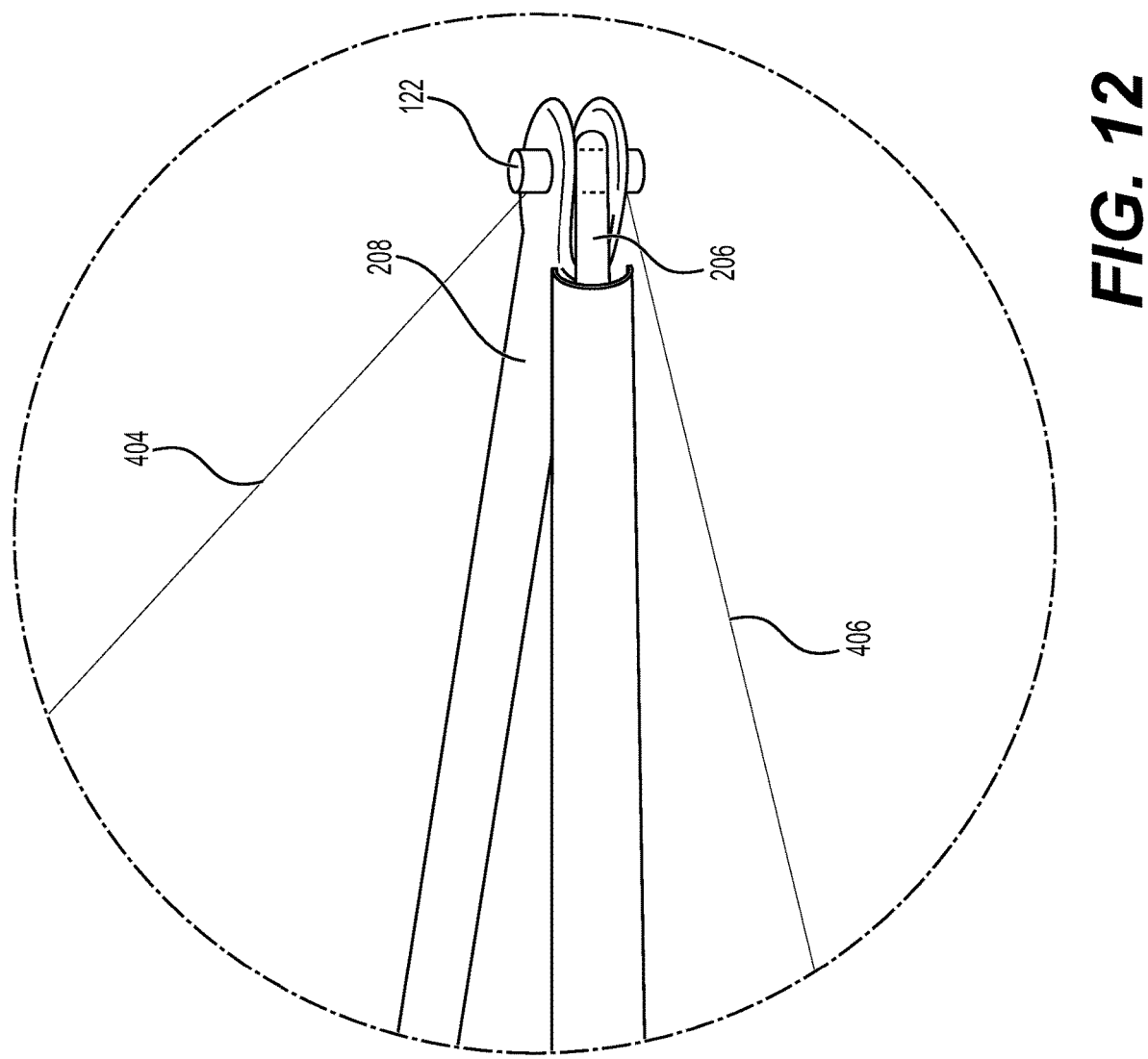
FIG. 12 depicts an enhanced view of a pivot joint showing the coupling between an outer support having a cover and an inner support.

First end of outer supports 206 are pivotally coupled to front mounting bracket 202 and second ends of outer supports 206 are pivotally coupled to first ends of inner supports 208. Second ends of inner supports 206 are coupled to wing bracket 414 of deployment support 216. An example pivot joint showing the coupling of an outer support 206 to an inner support 208 is depicted in FIGS. 11 and 12. In this embodiment, a pin 122 is inserted between the supports to allow pivoting. It should be obvious to one of ordinary skill in the art that any type of joint allowing pivoting can be used. FIG. 12 further depicts cover 120 mounted to outer supports 206 to provide lift as previously described.

The fabric 210 is coupled to outer supports 206 and inner supports 208 to form a wing structure when helicopter flight support 100 is fully deployed as will be shown later. Preferably, the fabric 210 is arranged in two layers with an upper layer and a lower layer. Outer supports 206 and inner supports 208 are preferably constructed from a durable but lightweight material such as aluminum or carbon fiber.

Figure 4:
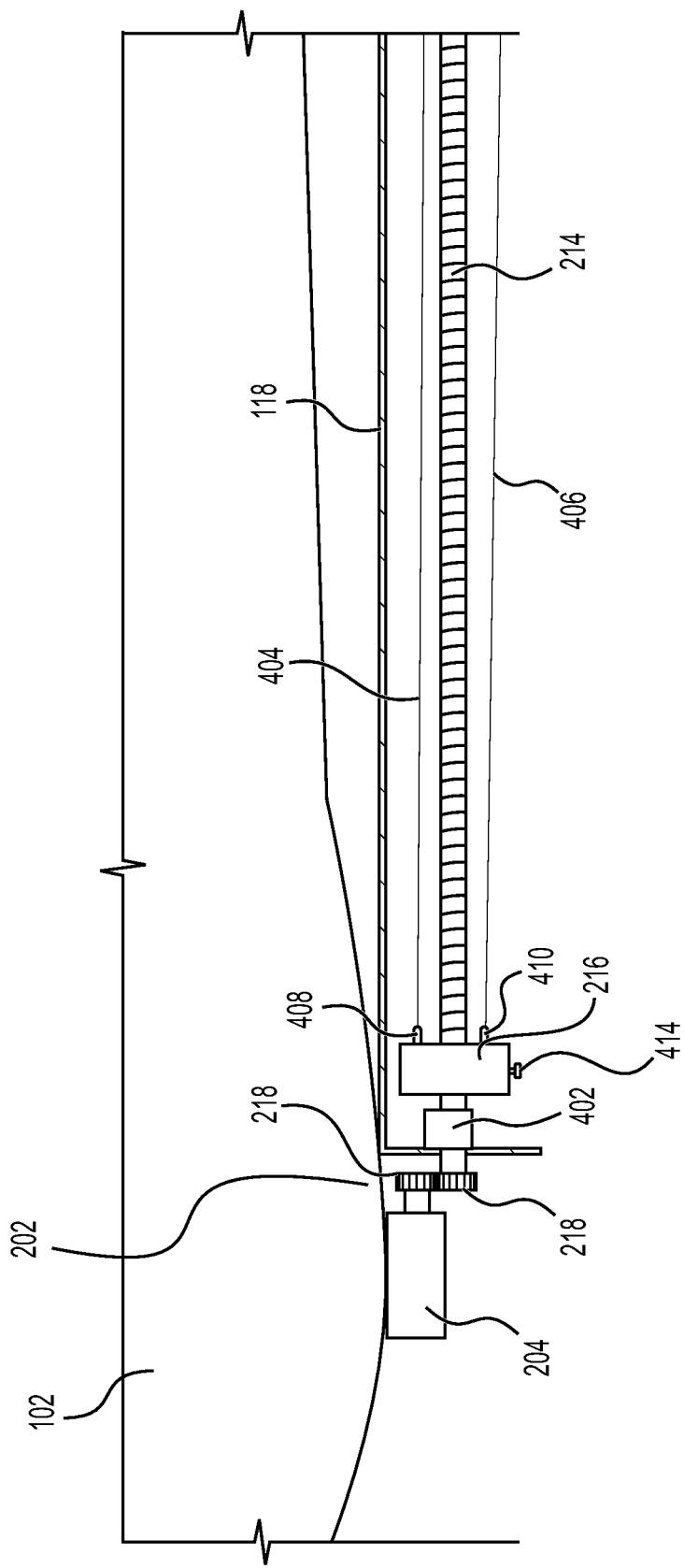
FIG. 4 depicts a side view of the helicopter flight support showing the coupling between the motor and the threaded shaft.
Figure 10:
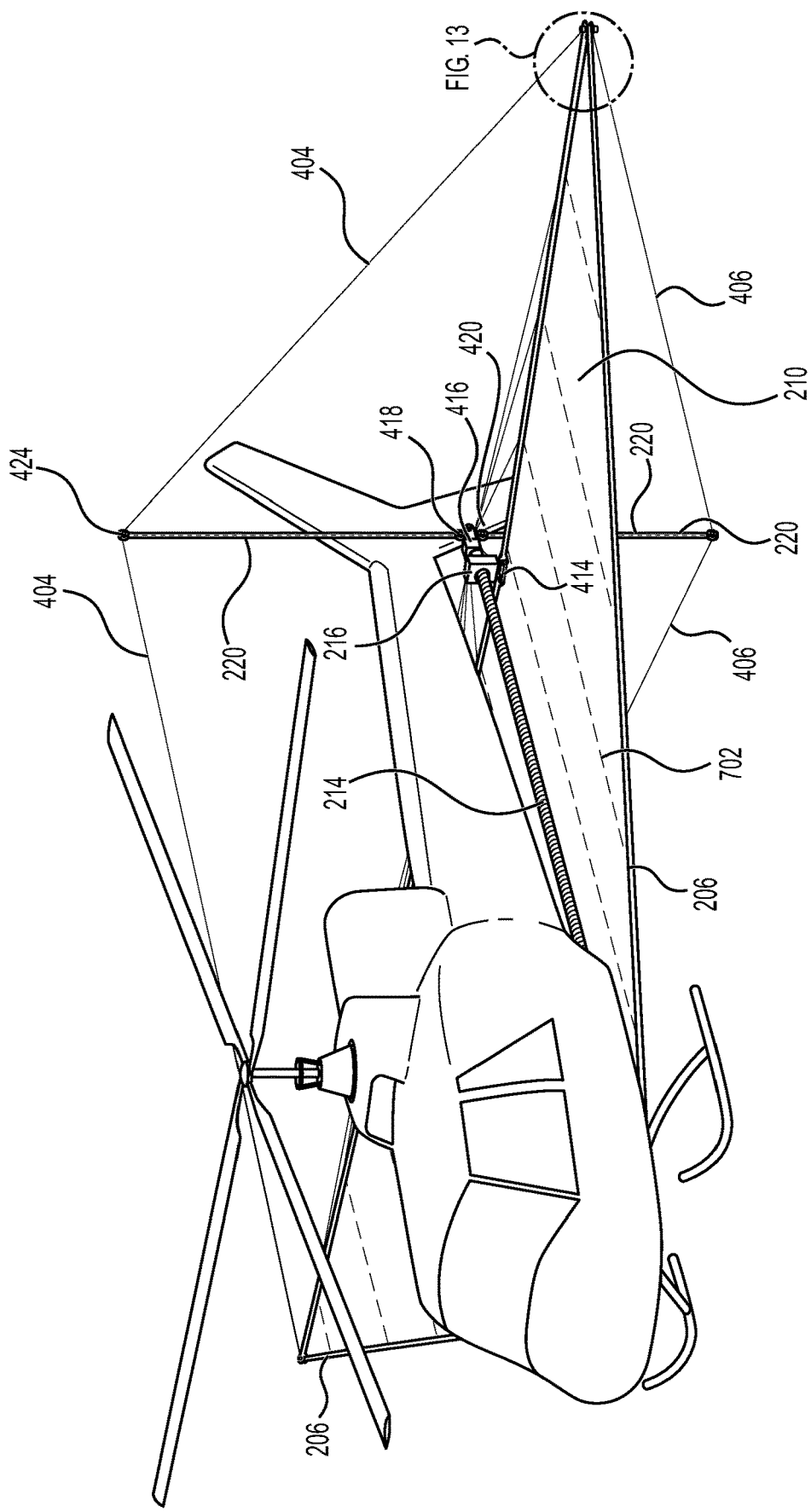
FIG. 10 depicts a front perspective view of the helicopter flight support fully deployed.
Figure 13:
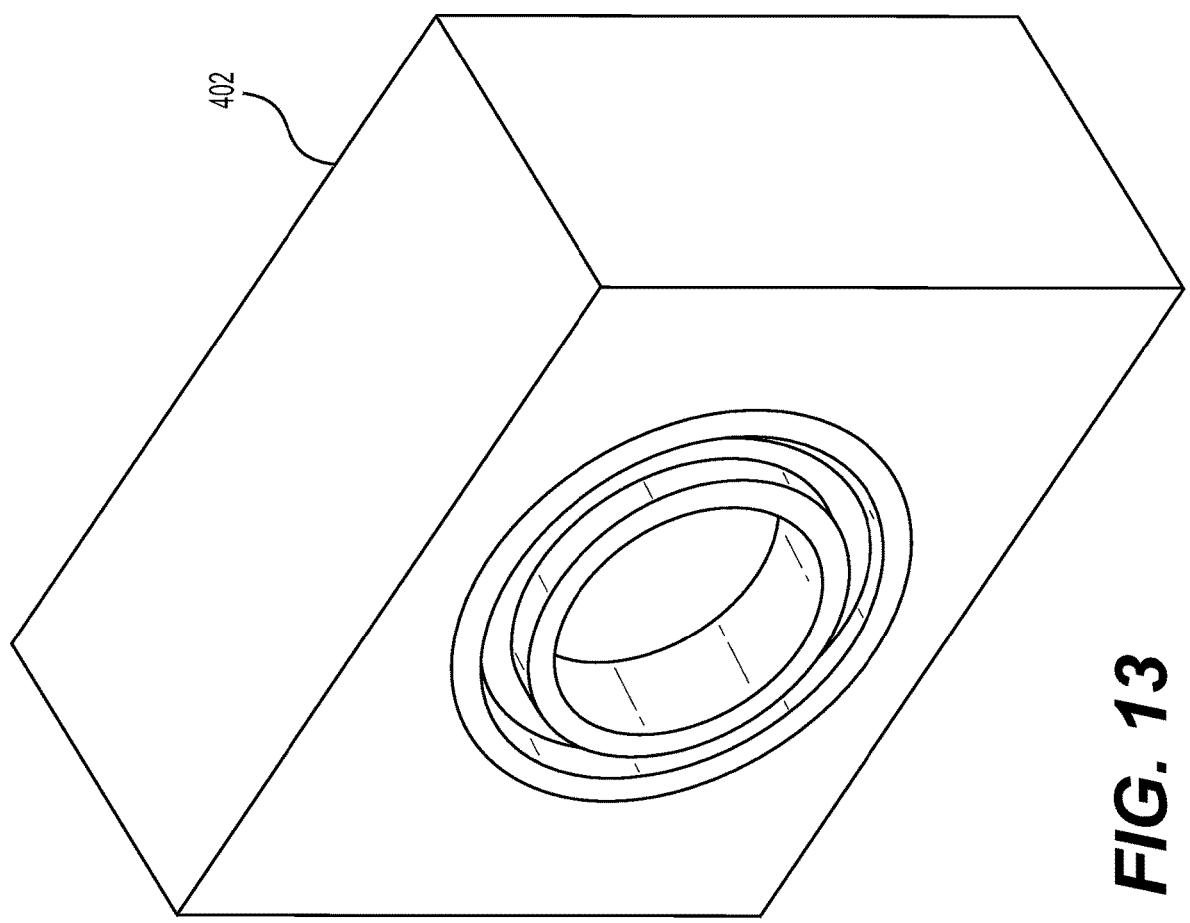
FIGS. 13 & 14 depict perspective views of ball bearing supports which allow the threaded shaft to freely rotate.

FIG. 4 depicts a side view showing the coupling between motor 204 and threaded shaft 214. Motor 204 and sheath 118 are coupled to an underside of helicopter 102 and/or front mounting bracket 202. The motor 204 receives power from an internal battery or directly from the power system of helicopter 102. Motor 204 turns a first coupling gear 218 whose teeth mate with a second coupling gear coupled to an end of threaded shaft 214. A first end of threaded shaft 214 comprises no threads so that the threaded shaft 214 can freely rotate within ball bearing support 402 which is mounted to sheath 118 (FIG. 13). In the stowed state of helicopter flight support 100, deployment support 216 resides at the first end 104. Two upper support cables 404 are coupled to the deployment support 216 at a first attachment point 408 and two lower support cables 406 are coupled to the deployment support 216 at a second attachment point 410. The other ends of upper support cables 404 and lower support cables 406 are coupled to edges of the wing of helicopter flight support 100 (FIG. 10).

Figure 5:
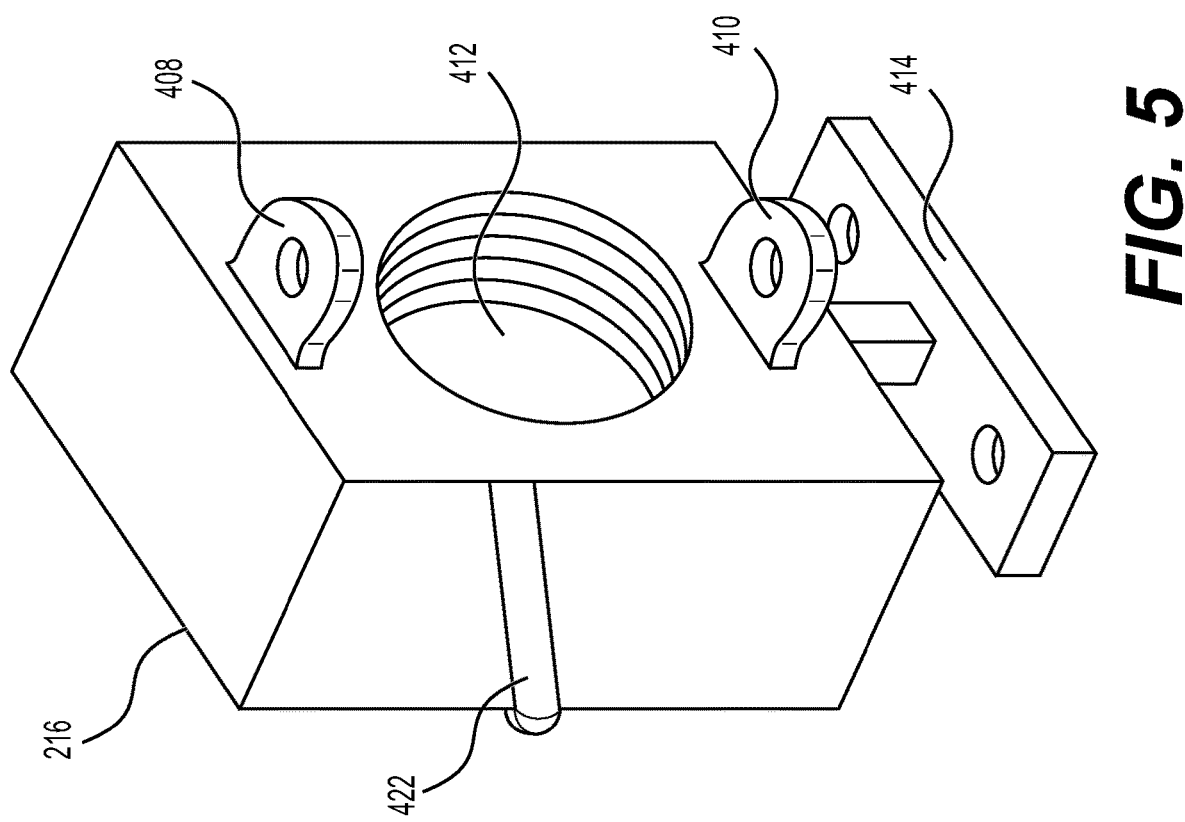
FIG. 5 depicts a perspective view of the deployment support.

A perspective view of a preferred embodiment of deployment support 216 is depicted in FIG. 5. Deployment support 216 is preferably rectangular or square in shape and comprises threaded opening 412 which mate with the threads on threaded shaft 214. As will be discussed later, rotation of threaded shaft 214 by motor 204 causes deployment support 216 to move along threaded shaft 214. A wing bracket 414 extends from a bottom of deployment support 216 below sheath 118 and preferably has a T-shape. Each side of the wing bracket 414 is pivotally coupled to a single outer support 206 with a coupling similar to that shown in FIG. 11.

The left and right sides of deployment support 216 may comprise one or more linear protrusions 422 which mate with a corresponding groove in sheath 118. This helps to ensure that deployment support 216 does not rotate and only moves linearly along the length of threaded shaft 214.

Figure 6:
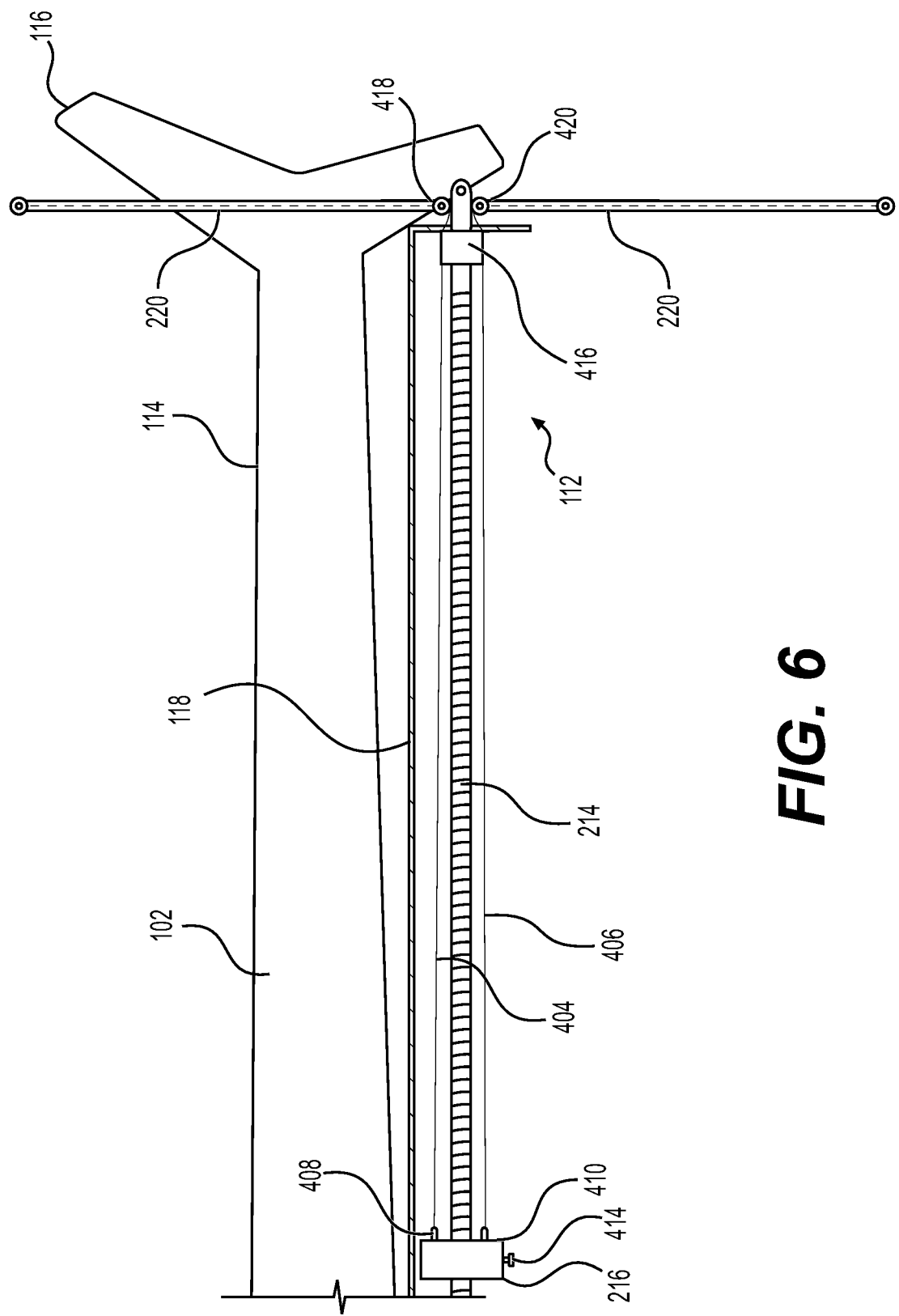
FIG. 6 depicts a side view of the rear section of the helicopter flight support.
Figure 14:
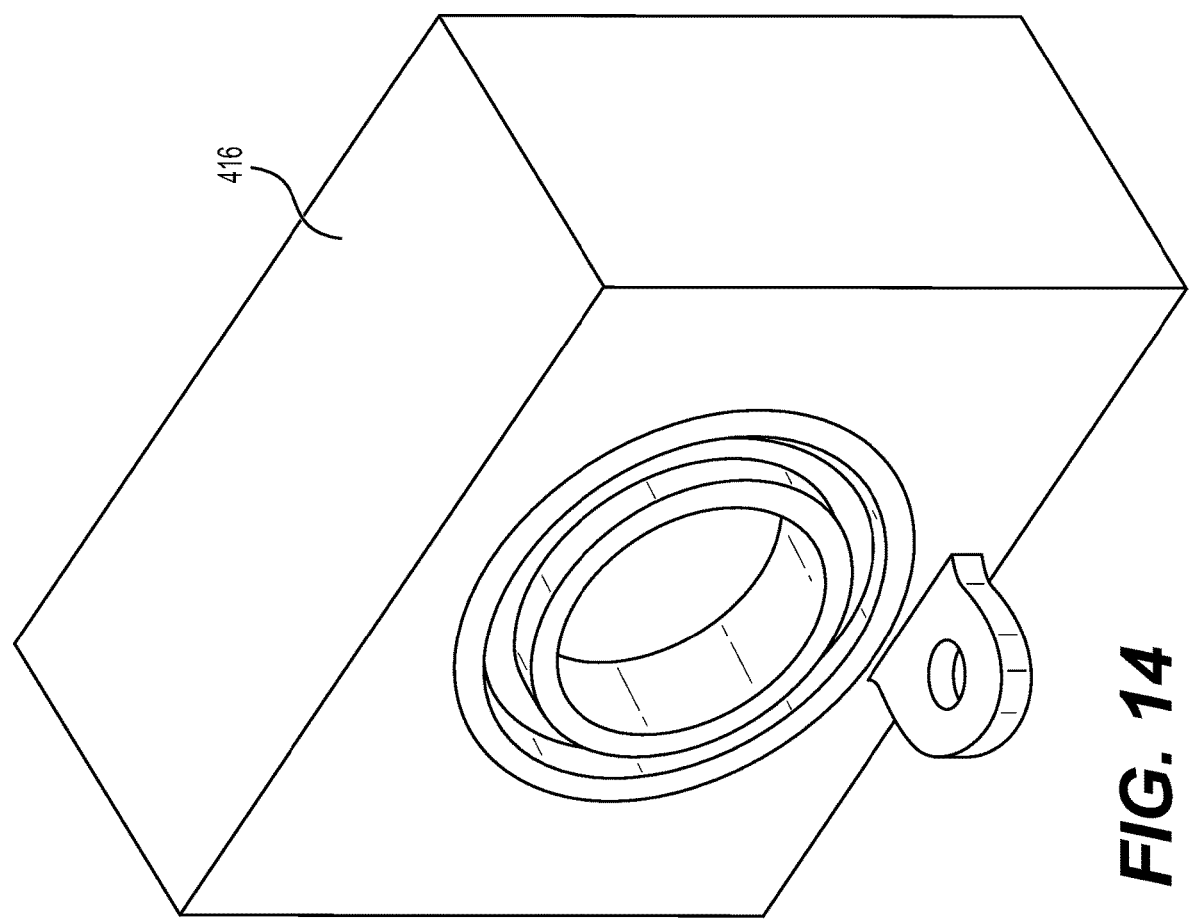

FIG. 6 depicts a side view showing the coupling between second end 112 and helicopter 102. A rear of sheath 118 and/or rear ball bearing support 416 is coupled to tail 114 or rudder 116. The exact coupling positions are dictated by the geometry of helicopter 102. The end of threaded shaft 214 comprises no threads so that it can rotate freely within rear ball bearing support 416 (FIG. 14). The threaded shaft 214 can freely rotate within the ball bearing opening while the body of ball bearing support 416 is fixed to helicopter 102. Further, as depicted in FIG. 7, the ends of all support cables 702 are coupled to ball bearing support 416.

Upper support cable 406 is routed along the length of sheath 118 and exits the rear over upper pulley(s) 418 into a first stability support 220. Lower support cable 406 is routed along the length of sheath 118 and exits the rear over lower pulley(s) 420 into a second stability support 220. Stability supports 220 are rigid tubes that are maintained in a vertical position through a coupling to helicopter 102. Both upper support cables 404 and lower support cables 406 are maintained under tension during deployment of helicopter flight support 100.

The deployment of helicopter flight support 100 will be described with respect to FIGS. 7-9. Upper support cables 404 and lower support cables 406 are not shown in these views for clarity. Upon detection of an emergency or by a pilot of helicopter 102, motor 204 begins turning threaded shaft 214, causing deployment support 216 to move along threaded shaft 214. As shown in FIG. 7, the pivoting of inner supports 208 about deployment support 216 causes outer supports 206 to pivot outward about front mounting bracket 202.

Figure 7:
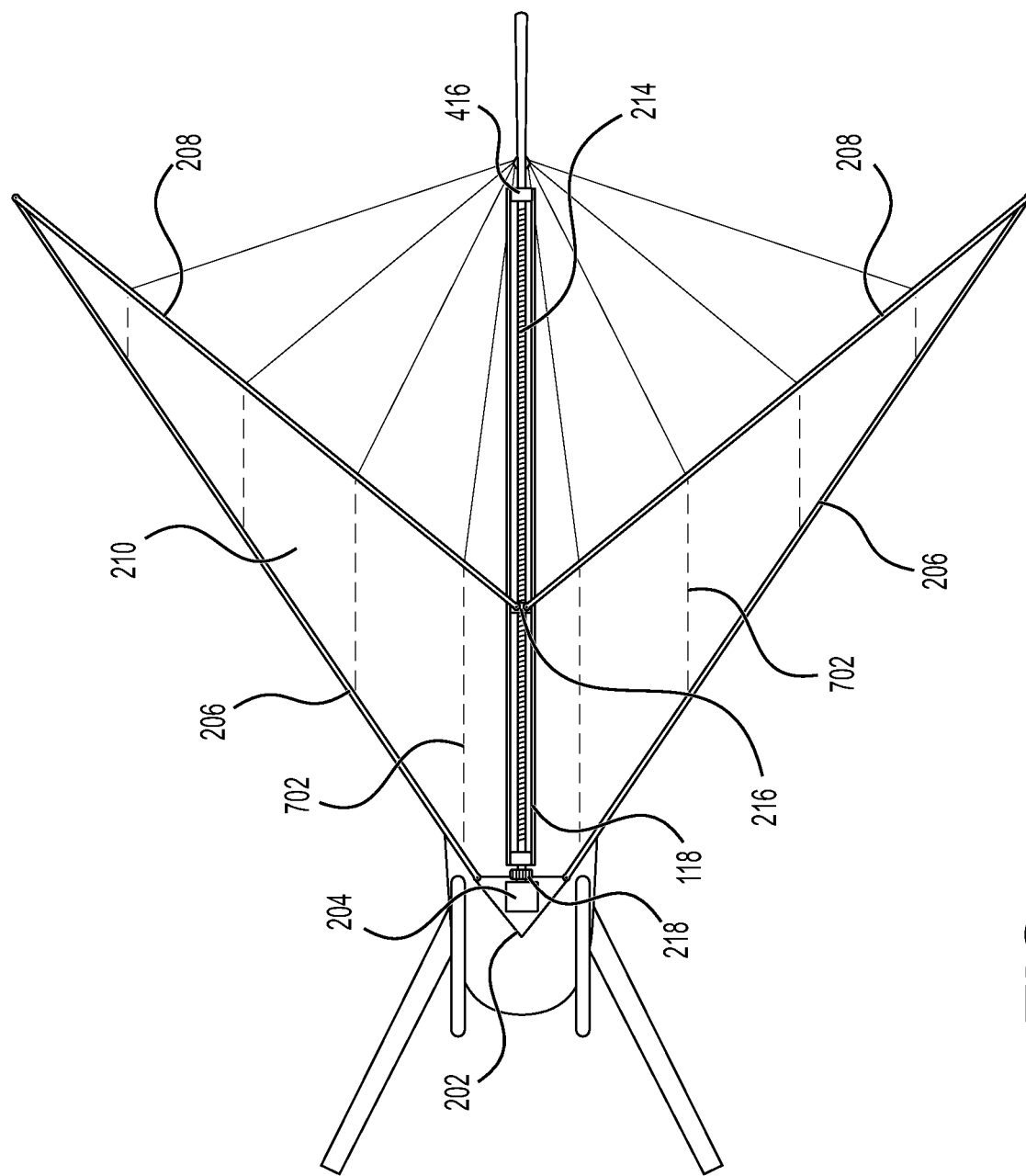
FIG. 7 depicts a bottom view of the helicopter flight support partially deployed.
Figure 8:
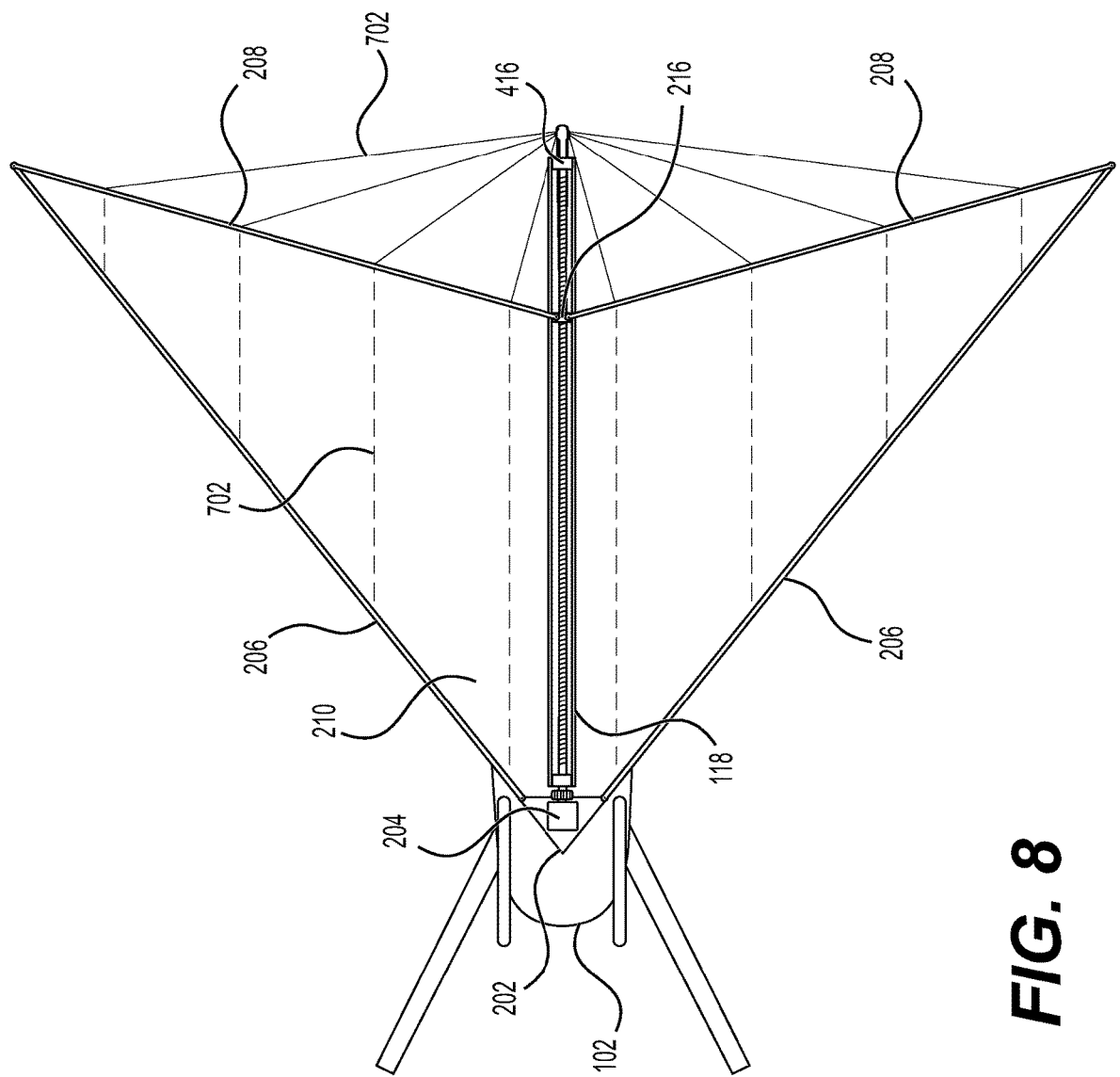
FIG. 8 depicts a bottom view of the helicopter flight support further deployed.
Figure 9:
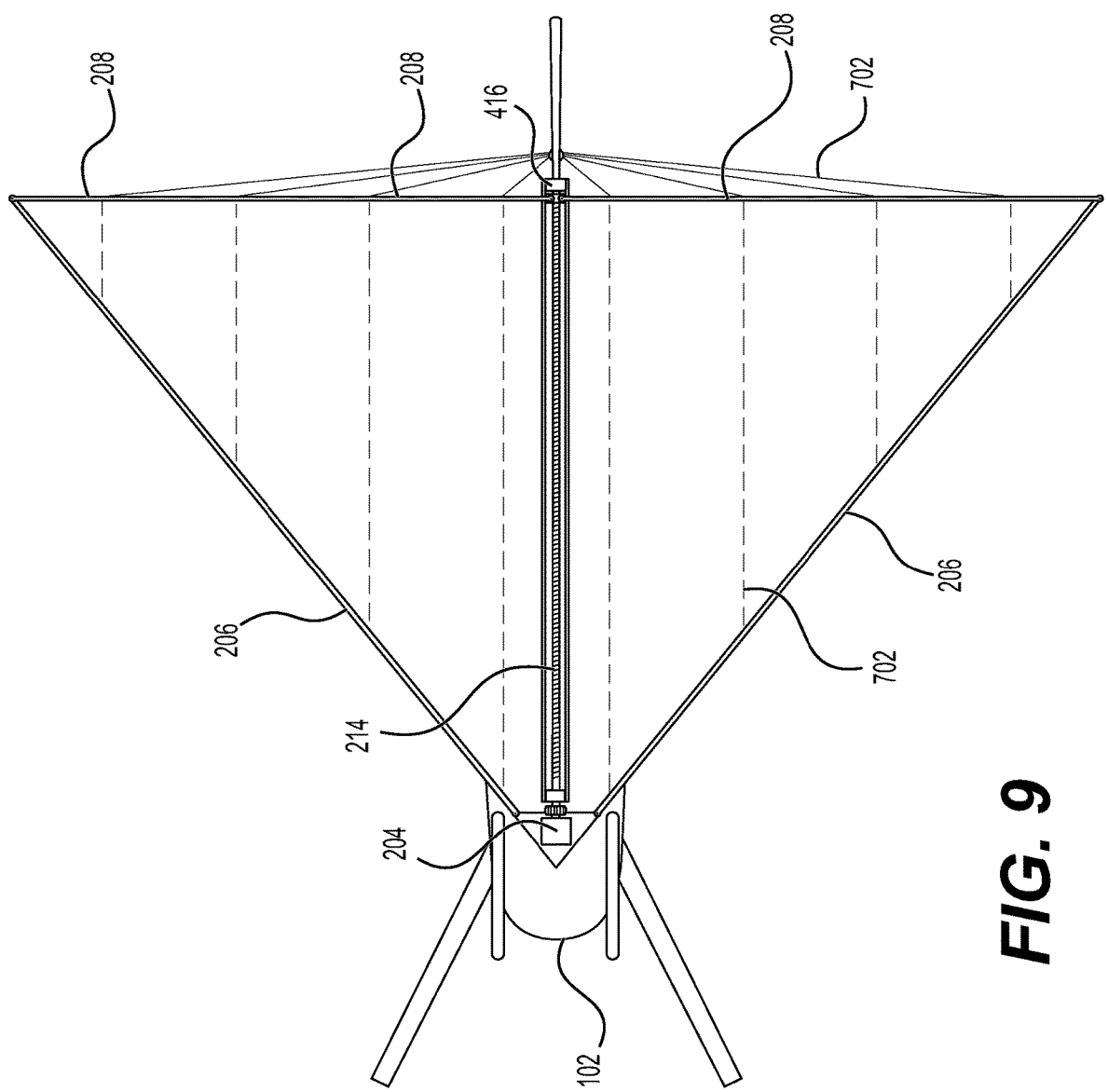
FIG. 9 depicts a bottom view of the helicopter flight support fully deployed.

Another feature of helicopter flight support 100 is depicted in FIGS. 7-9. Preferably, helicopter flight support 100 comprises an upper layer of fabric 210 and a lower layer of fabric 210. Fabric 210 is preferably a nylon parachute fabric such as Terlyene. A plurality of support cables 702 are sandwiched between the two layers of fabric. First ends of each support cable 702 are coupled to outer support 206 and exit through openings in inner support 208. The second ends of all support cables 702 are coupled to ball bearing support 416 at an attachment point (FIG. 14). The upper and lower layers of fabric are preferably sewed together at points surrounding support cables 702 to form internal channels for support cables 702. Support cables 702 help to maintain the rigidity of helicopter flight support 100 when deployed and help to cause fabric 210 to collapse when helicopter flight support 100 is stowed. It should be obvious to one of ordinary skill in the art that the number and location of support cables 702 can be varied in accordance with the requirements of helicopter flight support 100.

FIG. 8 depicts helicopter flight support 100 almost fully deployed. The fabric 210 is almost fully tensioned and begins to form a wing shape. FIG. 9 depicts helicopter flight support 100 fully deployed. At this point, the inner supports 208 are in line with each other and the helicopter flight support 100 has a triangular/wing shape. The support cables 702 are all parallel at this point and are perpendicular to inner supports 208.

FIG. 10 depicts helicopter flight support 100 in its final deployed state. At this point, deployment support 216 has moved to the rear of threaded shaft 214 and motor 204 stops turning, locking helicopter flight support in this state. The fabric 210 is fully tensioned into the described wing shape. All support cables 702 are parallel at this point and help provide rigidity to helicopter flight support 100. The complete routing of upper support cables 404 and lower support cables 406 can be seen in this view. First ends of upper support cables 404 are coupled to deployment support 216, are routed over upper pulley(s) 418, through stability support 220, over second upper pulley(s) 424, and are coupled to the connection points between outer supports 206 and inner supports 208 (i.e., to edges of the wing). Similarly, first ends of lower support cables 406 are coupled to deployment support 216, are routed over lower pulley(s) 418, through stability support 220, over second lower pulley(s) 426, and are coupled to the connection points between outer supports 206 and inner supports 208 (i.e., to edges of the wing). Since upper support cables 404 and lower support cables 406 are under tension, they help to provide further stability to helicopter flight support 100 in the deployed state.

While helicopter flight support 100 is deployed, it provides a large amount of surface area under helicopter 102 as shown in FIG. 11. Because there is separation between the top of fabric 210 and the underside of helicopter 102, helicopter flight support 100 acts similar to a glider and allows helicopter 102 to glide and have a longer and slower descent. The pilot can also use rudder 116 or the rotor to have some control over the descent of helicopter 102.

Because helicopter flight support 100 is primarily configured for use during emergency situations, it may not survive a landing in working condition. However, if helicopter flight support 100 remains intact after landing, it is possible to reuse helicopter flight support 100. All that is required is for deployment support 216 to be moved back to its initial position to cause reversal of the process depicted in FIGS.

7-9. After helicopter flight support 100 is collapsed, the fabric 210 can be gathered and stowed again within cover 120 by a technician or pilot.

The invention claimed is:
1. A helicopter flight support for a helicopter comprising:
a first outer support having a first end pivotally coupled to a bottom of the helicopter near a front of the helicopter;
a second outer support having a first end pivotally coupled to a bottom of the helicopter opposite the first outer support;
a rotatable shaft having a threaded portion coupled to the helicopter between the first outer support and the second outer support;
a motor for rotating the threaded shaft;
a deployment support having a threaded opening configured to mate with the threaded portion of the rotatable shaft;
a first inner support having a first end pivotally coupled to the second end of the first outer support at a first pivot joint;
a second inner support having a first end pivotally coupled to the second end of the second outer support at a second pivot joint,
wherein a second end of the first inner support is pivotally coupled to the deployment support, and
wherein a second end of the second inner support is pivotally coupled to the deployment support; and
a first layer of fabric and a second layer of fabric having a wing shape coupled to the first outer support, the second outer support, the first inner support, and the second inner support;
wherein rotation of the rotatable shaft in a first direction by the motor causes movement of the deployment support along the threaded section towards a rear of the helicopter to cause deployment of the helicopter flight support; and
a sheath having an open bottom covering at least the threaded portion of the rotatable shaft and the deployment support.

2. The helicopter flight support according to claim 1, further comprising:
a plurality of support cables having first ends coupled to an inner edge of the first outer support and second ends coupled to an attachment point mounted to a rear of the helicopter in a vicinity of the rotatable shaft,
wherein the plurality of support cables exit openings in the first inner support before joining with the attachment point.

3. The helicopter flight support of claim 2, wherein the plurality of support cables are sandwiched between the first layer of fabric and the second layer of fabric.

4. The helicopter flight support of claim 1, further comprising:
a first cover having a semioval shape coupled to an outer edge of the first outer support; and
a second cover having a semioval shape coupled to an outer edge of the second outer support,
wherein the first cover has a first edge that mates with a second edge of the second cover when the helicopter flight support is in an undeployed configuration to form an oval-shaped or circular cover for the helicopter flight support.

5. The helicopter flight support according to claim 1, further comprising:
a first ball bearing support mounted to an underside of the helicopter at a first end; and
a second ball bearing support mounted to the helicopter near a tail or rudder of the helicopter,
wherein a first end of the rotatable shaft freely rotates within the first ball bearing support, and
wherein a second end of the rotatable shaft freely rotates within the second ball bearing support.

6. The helicopter flight support according to claim 1, further comprising:
an upper stability support having a cylindrical shape coupled to the rear of the helicopter in a vertical configuration;
a lower stability support having a cylindrical shape coupled to the rear of the helicopter in a vertical configuration;
a first set of upper support cables; and
a first set of lower support cables,
wherein first ends of the upper support cables are coupled to the deployment support and second ends of the upper support cables are coupled to the first pivot joint and the second pivot joint, and
wherein the upper support cables are routed through the upper stability support,
wherein first ends of the lower support cables are coupled to the deployment support and second ends of the lower support cables are coupled to the first pivot joint and the second pivot joint, and
wherein the lower support cables are routed through the lower stability support.

7. The helicopter flight support according to claim 1, wherein the first fabric is a nylon parachute fabric, and wherein the second fabric is a nylon parachute fabric.

8. The helicopter flight support according to claim 1, further comprising:
a plurality of support cables having first ends coupled to an inner edge of the first outer support and second ends coupled to an attachment point mounted to a rear of the helicopter in a vicinity of the rotatable shaft,
wherein the plurality of support cables exit equally spaced openings in the first inner support before joining with the attachment point.

9. The helicopter flight support according to claim 8, wherein a portion of the plurality of support cables sandwiched between the first fabric and the second fabric are substantially parallel when the helicopter flight support is in a deployed configuration.

10. The helicopter flight support according to claim 8, wherein the first fabric and the second fabric are joined to each other in the vicinity of each cable of the plurality of support cables to form a channel for each cable.

11. The helicopter flight support according to claim 1, wherein the first outer support and the second outer support are formed from aluminum or carbon fiber.

12. The helicopter flight support according to claim 1, wherein the first outer support and the second outer support have a same length.

13. The helicopter flight support according to claim 12, wherein the first inner support and the second inner support have a same length.

14. The helicopter flight support according to claim 13, wherein a length of the first outer support is greater than a length of the first inner support.

15. The helicopter flight support according to claim 1, wherein the helicopter flight support forms a wing having a substantially triangular configuration after deployment.

16. A helicopter flight support for a helicopter comprising:
a first outer support having a first end pivotally coupled to a bottom of the helicopter near a front of the helicopter;

a second outer support having a first end pivotally coupled to a bottom of the helicopter opposite the first outer support;
a rotatable shaft having a threaded portion coupled to the helicopter between the first outer support and the second outer support;
a motor for rotating the threaded shaft;
a deployment support having a threaded opening configured to mate with the threaded portion of the rotatable shaft;
a first inner support having a first end pivotally coupled to the second end of the first outer support at a first pivot joint;
a second inner support having a first end pivotally coupled to the second end of the second outer support at a second pivot joint,
wherein a second end of the first inner support is pivotally coupled to the deployment support, and
wherein a second end of the second inner support is pivotally coupled to the deployment support;
a first layer of fabric and a second layer of fabric having a wing shape coupled to the first outer support, the second outer support, the first inner support, and the second inner support;
wherein rotation of the rotatable shaft in a first direction by the motor causes movement of the deployment support along the threaded section towards a rear of the helicopter to cause deployment of the helicopter flight support; and
a plurality of support cables having first ends coupled to an inner edge of the first outer support and second ends coupled to an attachment point mounted to a rear of the helicopter in a vicinity of the rotatable shaft,
wherein the plurality of support cables exit openings in the first inner support before joining with the attachment point.

17. The helicopter flight support of claim 16, wherein the plurality of support cables are sandwiched between the first layer of fabric and the second layer of fabric.

18. A helicopter flight support for a helicopter comprising:
a first outer support having a first end pivotally coupled to a bottom of the helicopter near a front of the helicopter;
a second outer support having a first end pivotally coupled to a bottom of the helicopter opposite the first outer support;
a rotatable shaft having a threaded portion coupled to the helicopter between the first outer support and the second outer support;
a motor for rotating the threaded shaft;
a deployment support having a threaded opening configured to mate with the threaded portion of the rotatable shaft;
a first inner support having a first end pivotally coupled to the second end of the first outer support at a first pivot joint;
a second inner support having a first end pivotally coupled to the second end of the second outer support at a second pivot joint,
wherein a second end of the first inner support is pivotally coupled to the deployment support, and
wherein a second end of the second inner support is pivotally coupled to the deployment support;
a first layer of fabric and a second layer of fabric having a wing shape coupled to the first outer support, the second outer support, the first inner support, and the second inner support;
wherein rotation of the rotatable shaft in a first direction by the motor causes movement of the deployment support along the threaded section towards a rear of the helicopter to cause deployment of the helicopter flight support;
a first ball bearing support mounted to an underside of the helicopter at a first end; and
a second ball bearing support mounted to the helicopter near a tail or rudder of the helicopter,
wherein a first end of the rotatable shaft freely rotates within the first ball bearing support, and
wherein a second end of the rotatable shaft freely rotates within the second ball bearing support.

19. A helicopter flight support for a helicopter comprising:
a first outer support having a first end pivotally coupled to a bottom of the helicopter near a front of the helicopter;
a second outer support having a first end pivotally coupled to a bottom of the helicopter opposite the first outer support;
a rotatable shaft having a threaded portion coupled to the helicopter between the first outer support and the second outer support;
a motor for rotating the threaded shaft;
a deployment support having a threaded opening configured to mate with the threaded portion of the rotatable shaft;
a first inner support having a first end pivotally coupled to the second end of the first outer support at a first pivot joint;
a second inner support having a first end pivotally coupled to the second end of the second outer support at a second pivot joint,
wherein a second end of the first inner support is pivotally coupled to the deployment support, and
wherein a second end of the second inner support is pivotally coupled to the deployment support;
a first layer of fabric and a second layer of fabric having a wing shape coupled to the first outer support, the second outer support, the first inner support, and the second inner support;
wherein rotation of the rotatable shaft in a first direction by the motor causes movement of the deployment support along the threaded section towards a rear of the helicopter to cause deployment of the helicopter flight support;
an upper stability support having a cylindrical shape coupled to the rear of the helicopter in a vertical configuration;
a lower stability support having a cylindrical shape coupled to the rear of the helicopter in a vertical configuration;
a first set of upper support cables; and
a first set of lower support cables,
wherein first ends of the upper support cables are coupled to the deployment support and second ends of the upper support cables are coupled to the first pivot joint and the second pivot joint, and
wherein the upper support cables are routed through the upper stability support,
wherein first ends of the lower support cables are coupled to the deployment support and second ends of the lower support cables are coupled to the first pivot joint and the second pivot joint, and
wherein the lower support cables are routed through the lower stability support.

20. A helicopter flight support for a helicopter comprising:
a first outer support having a first end pivotally coupled to a bottom of the helicopter near a front of the helicopter;
a second outer support having a first end pivotally coupled to a bottom of the helicopter opposite the first outer support;
a rotatable shaft having a threaded portion coupled to the helicopter between the first outer support and the second outer support;
a motor for rotating the threaded shaft;
a deployment support having a threaded opening configured to mate with the threaded portion of the rotatable shaft;
a first inner support having a first end pivotally coupled to the second end of the first outer support at a first pivot joint;
a second inner support having a first end pivotally coupled to the second end of the second outer support at a second pivot joint,
wherein a second end of the first inner support is pivotally coupled to the deployment support, and
wherein a second end of the second inner support is pivotally coupled to the deployment support;
a first layer of fabric and a second layer of fabric having a wing shape coupled to the first outer support, the second outer support, the first inner support, and the second inner support;
wherein rotation of the rotatable shaft in a first direction by the motor causes movement of the deployment support along the threaded section towards a rear of the helicopter to cause deployment of the helicopter flight support; and
a plurality of support cables having first ends coupled to an inner edge of the first outer support and second ends coupled to an attachment point mounted to a rear of the helicopter in a vicinity of the rotatable shaft,
wherein the plurality of support cables exit equally spaced openings in the first inner support before joining with the attachment point.

21. The helicopter flight support according to claim 20, wherein a portion of the plurality of support cables sandwiched between the first fabric and the second fabric are substantially parallel when the helicopter flight support is in a deployed configuration.

22. The helicopter flight support according to claim 20, wherein the first fabric and the second fabric are joined to each other in the vicinity of each cable of the plurality of support cables to form a channel for each cable.

* * * * *

UNITED STATES PATENT AND TRADEMARK OFFICE
CERTIFICATE OF CORRECTION

PATENT NO. : 11,905,022 B2
APPLICATION NO. : 17/683877
DATED : February 20, 2024
INVENTOR(S) : Schain Lolatchy It is certified that error appears in the above-identified patent and that said Letters Patent is hereby corrected as shown below:

In the Specification

Column 4, Line 8: delete "Terlyene" and insert --Terylene-- therefor.

Signed and Sealed this
Twenty-fifth Day of June, 2024

*Katherine Kelly Vidal*

Katherine Kelly Vidal
*Director of the United States Patent and Trademark Office*